(12) United States Patent
Ishimaru et al.

(10) Patent No.: US 7,942,561 B2
(45) Date of Patent: May 17, 2011

(54) LIGHT GUIDE HAVING REFLECTIVE PROTRUDING PORTION, AND LIGHTING DEVICES INCLUDING SUCH LIGHT GUIDE

(75) Inventors: Takeshi Ishimaru, Tokyo (JP); Takashi Kishimoto, Tokyo (JP); Hidemitsu Takeuchi, Tokyo (JP); Tomihisa Saito, Tokyo (JP); Hideki Azuma, Tokyo (JP); Takahiro Hashimoto, Tokyo (JP)

(73) Assignee: Nippon Sheet Glass Compny, Limited, Tokyo (JP)

( * ) Notice: Subject to any disclaimer, the term of this patent is extended or adjusted under 35 U.S.C. 154(b) by 55 days.

(21) Appl. No.: 12/087,549

(22) PCT Filed: Dec. 27, 2006

(86) PCT No.: PCT/JP2006/326120
§ 371 (c)(1),
(2), (4) Date: Jul. 9, 2008

(87) PCT Pub. No.: WO2007/080798
PCT Pub. Date: Jul. 19, 2007

(65) Prior Publication Data
US 2009/0003016 A1    Jan. 1, 2009

(30) Foreign Application Priority Data

Jan. 10, 2006  (JP) .................................. 2006-001987

(51) Int. Cl.
*F21V 7/04* (2006.01)

(52) U.S. Cl. ........ 362/551; 362/609; 362/628; 362/555; 385/146

(58) Field of Classification Search ................... 385/146; 359/475, 484, 509; 362/551, 55, 231, 609, 362/615–617
See application file for complete search history.

(56) References Cited

U.S. PATENT DOCUMENTS

| | | | |
|---|---|---|---|
| 2005/0195618 A1* | 9/2005 | Uemura et al. | 362/558 |
| 2005/0206800 A1* | 9/2005 | Wakisaka et al. | 349/58 |
| 2005/0265684 A1 | 12/2005 | Nemoto et al. | |
| 2006/0056789 A1* | 3/2006 | Saito et al. | 385/140 |
| 2006/0120098 A1* | 6/2006 | Ikeda et al. | 362/551 |

FOREIGN PATENT DOCUMENTS

| | | |
|---|---|---|
| CN | 1702484 A | 11/2005 |
| JP | 07-183994 | 7/1995 |
| JP | 11-006919 | 1/1999 |
| JP | 2004-056425 | 2/2004 |
| JP | 2005-341141 | 12/2005 |
| KR | 10-2006-0048070 | 5/2006 |

* cited by examiner

*Primary Examiner* — Ismael Negron
(74) *Attorney, Agent, or Firm* — Carrier Blackman & Associates, P.C.; Joseph P. Carrier; William D. Blackman (57) ABSTRACT

A rod- or plate-shaped light guide includes a first end that receives illuminating light incident thereon, a bottom surface having a reflecting portion thereon for reflecting the light, an emitting face which emits the reflected light, and a protruding portion protruding longitudinally and continuously from the light guide at a second end thereof. The protruding portion has a reduced peripheral dimension compared to a peripheral dimension of an adjacent portion of the light guide, and a reflective body is provided on the protruding portion and covers a longitudinal end face of the protruding portion extending perpendicular to the emitting face. When viewed along an axial direction of the light guide, the reflective body does not jut out from an end face of the light guide even when the body wraps on to a side surface of the protruding portion or expansion occurs.

17 Claims, 8 Drawing Sheets

LIGHT GUIDE HAVING REFLECTIVE PROTRUDING PORTION, AND LIGHTING DEVICES INCLUDING SUCH LIGHT GUIDE

CROSS-REFERENCE TO RELATED APPLICATIONS

The present application is a U.S. National phase of, and claims priority based on PCT/JP2006/326120, filed 27 Dec. 2006, which, in turn, claims priority from Japanese patent application 2006-001987, filed 10 Jan. 2006. The entire disclosure of each of the referenced priority documents is incorporated herein by reference.

1. Technical Field

The present invention relates to a light guide for use in combination with a light emitting unit such as a laser diode (LD) or light-emitting diode (LED), a lighting device including the light guide, and an image reading device having the lighting device installed therein.

1. Background Art

A generally known method for building line lighting devices is to form a linear light source by aligning surface-mounted miniature LEDs in order to reduce unevenness in illumination intensity at the paper surface. However, variation of the brightness of the miniature LEDs gives rise to unevenness in the illumination intensity. Also, parts are numerous and the cost of assembling these parts is high. For these reasons, a line or surface-type light emitting unit having fewer parts and an unevenness of illumination intensity within a permissible range has been desired.

To solve the above problems, a line lighting device having a light emitting unit disposed at one end of a rod-like light guide with a rectangular cross-section has been proposed. For instance, a construction has been disclosed in which a rod-like light guide with a rectangular cross-section is used, a light scattering pattern is provided on a side face corresponding to one of the longitudinal sides of the rectangle, the other longitudinal side corresponds to an emitting face, the area per unit length of the light scattering pattern increases with separation from the light emitting unit, the light source of the light emitting unit is provided perpendicular to face where the light scattering pattern surface is disposed, and the rod-like light guide is fixedly contained inside a white case. (Patent Document 1)

Further, a light guide having a reflective surface on an end thereof has been disclosed. The provision of a reflective body on an end face on the opposite side of the light guide to the light emitting unit makes it possible to use the available light effectively. The reflective surface may be formed by deposition of a metal such as aluminum or the like or by applying a light scattering reflective coating to a surface of end portion of the transparent member that forms the light guide. Alternatively, the reflective surface may be provided as a separate member to the light guide. (Patent Document 2)

Patent Document 1: Japanese Patent Laid-Open No. 2004-056425

Patent Document 2: Japanese Patent Laid-Open No. 07-183994

When the light scattering pattern provided on the light guide is formed by screen printing or the like using white coating as described in Patent Document 1, there is a problem in that the cost of applying the coating is high.

Moreover, when the reflective coating is applied to the transparent member as described in Patent Document 2, there is a problem in that high costs are incurred. High costs are also incurred when the reflective surface is provided by depositing aluminum or the like, by applying a scattering reflective coating, or by providing a light-reflecting member as a separate member.

Figure 10:
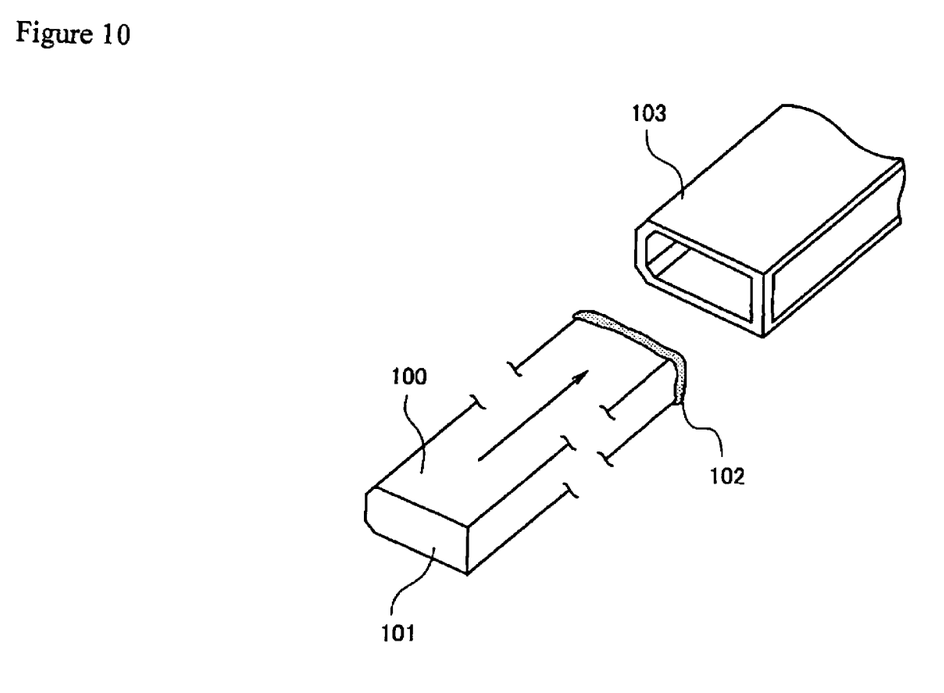
FIG. 10 is a diagram showing a conventional rod-like light guide being housed in a case.

Beside the above, the techniques of the Patent Documents 1 and 2 also share the following problems. FIG. 10 is a diagram showing a conventional rod-like light guide 100 being housed in a case 103. A reflecting end face on an opposite side to an incident end face 101 of the rod-like light guide 100 is covered by a reflective body 102. However, when the reflective body 102 is deposited, the reflecting end face undergoes thermal deformation, causing an edge portion to expand. If, for example, the reflective body grows larger than the exterior form of the light guide in the manner shown in FIG. 10, the light guide cannot be housed in the case 103. Further, burr can occur when the rod-like light guide is cut perpendicular to the longitudinal direction. The burr can cause damage when the reflective body and the light guide are bonded together and affect the reflectance of the reflective body.

SUMMARY OF THE INVENTION

To solve the above-described problems, the present invention provides either of a rod-like or a plate-like light guide which reflects illuminating light incident at a first end using a light reflecting portion provided on a bottom surface and emits the reflected illuminating light from an emitting face, the light guide including: a protruding portion formed at a second end; and a reflective body provided on the protruding portion, wherein an external dimension of an end surface of the protruding portion is set so that, viewed along an axial direction of the light guide, the reflective body does not jut out from an end face of the light guide even when the reflective body wraps on to a side surface of the protruding portion or expansion occurs.

The reflective body may be a heat transfer film. In this case, the external dimension of the end face of the protruding portion seen when looking along the axial direction of the light guide is set so that even if the heat transfer film expands due to the heat applied when thermally transferring the heat transfer film, the heat transfer film does not jut out from the end face of the light guide.

Further, in the light guide, a peripheral surface of the light guide may be made up of a top face that is an emitting face, two side faces, a bottom face and a plane portion formed by performing a C-chamfer working between the bottom face and each of the two side faces, so that the end face forms a six-sided shape.

Further, a line lighting device may include the light guide; a case for housing the light guide so as to expose the emitting face; and a light source fixed at one end of the case.

Further, in the line lighting device, an extended portion may be provided along a longitudinal direction of the case, and a reflective body may be provided on an extended portion surface that opposes the emitting face of the light guide.

Further, an image reading device may include: the line lighting device; a line image sensor including a photoelectric conversion device; and a lens array for focusing, towards the line image sensor, reflected light from the paper, the reflected light being a portion of illumination light from the line lighting device.

Conventionally, when the heat transfer film was applied to the end face of the rod-like light guide, the heat melted a portion of the end face, causing the cross-sectional area of the cut portion to exceed the cross-sectional area of the non-cut portion. This caused a problem in that it became difficult to fit the rod-like light guide into the white case. According to the present invention, however, the end face of the rod-like light guide is formed as a protruding portion, and the heat transfer film is only provided on the resulting projecting section. As a result, the rod-like light guide can be inserted into the white case without being affected by regions of thermal deformation or burring.

DETAILED DESCRIPTION OF BEST MODE FOR CARRYING OUT THE INVENTION

The following describes in detail the preferred embodiments of the present invention based on the drawings. Note that, in the following description, portions which function in the same manner have been denoted by the same reference characters, and repeated description of these portions have been omitted.

First Embodiment

Figure 1:
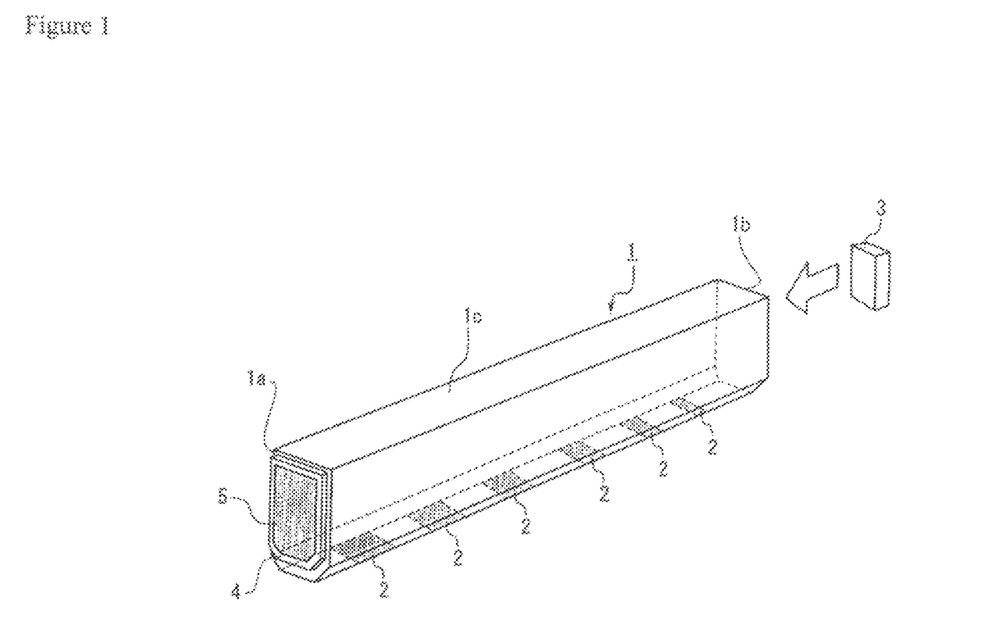
FIG. 1 is a perspective view of a rod-like light guide to which a reflective body has been bonded, according to an exemplary embodiment of the present invention.

FIG. 1 is a perspective view of a rod-like light guide 1 to which a reflective body has been bonded, according to the present invention. The rod-like light guide 1 is preferably a transparent acrylic or similar resin, but other transparent members such as glass members may be used. A scattering pattern 2 is printed on a bottom portion of the rod-like light guide. The scattering pattern 2 has a narrower pattern width towards an incident end face 1b of the rod-like light guide and a wider pattern width towards a reflecting end face 1a.

Light incident on internal portions of the rod-like light guide 1 from a light source 3 is reflected by the scattering pattern 2. A portion of the reflected light is emitted from an emitting face 1c and the other portion proceeds towards a reflecting end face 1a while being reflected by internal portions of the rod-like light guide 1 and is reflected by a reflective body 5 bonded to a protruding portion 4. A further portion of the light is then emitted from an emitting face 1c.

Figure 2A:
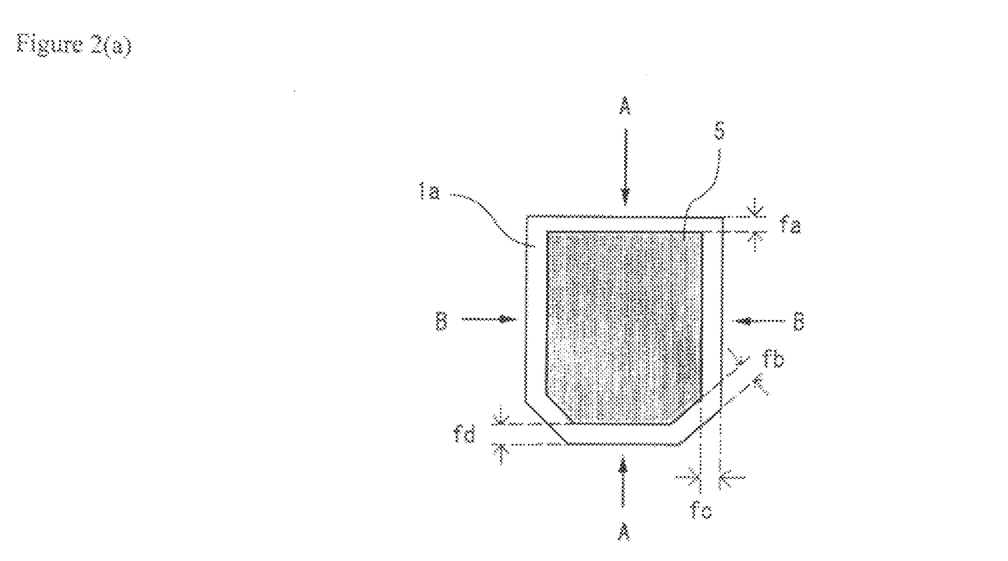
FIG. 2(a) is a diagram of the end face of the light guide.
Figure 2B:
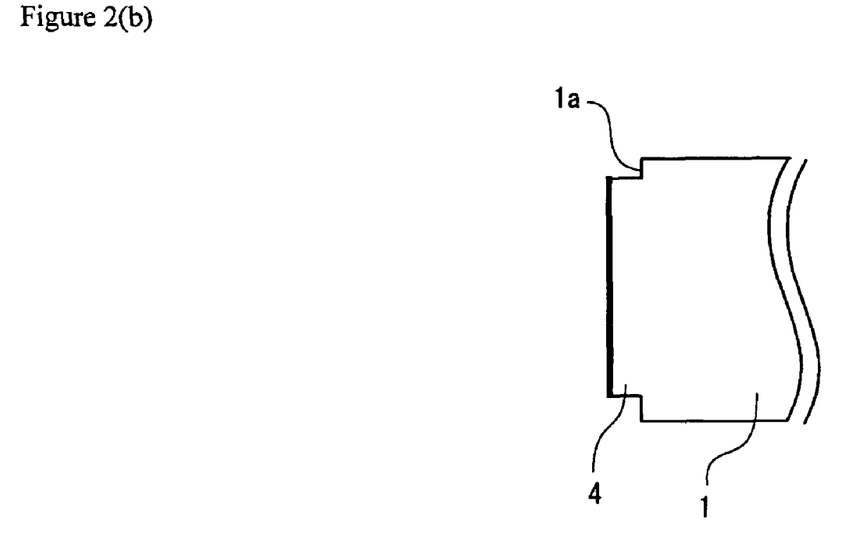
FIG. 2(b) is a cross-sectional view through A-A in FIG. 2(a)
Figure 2C:
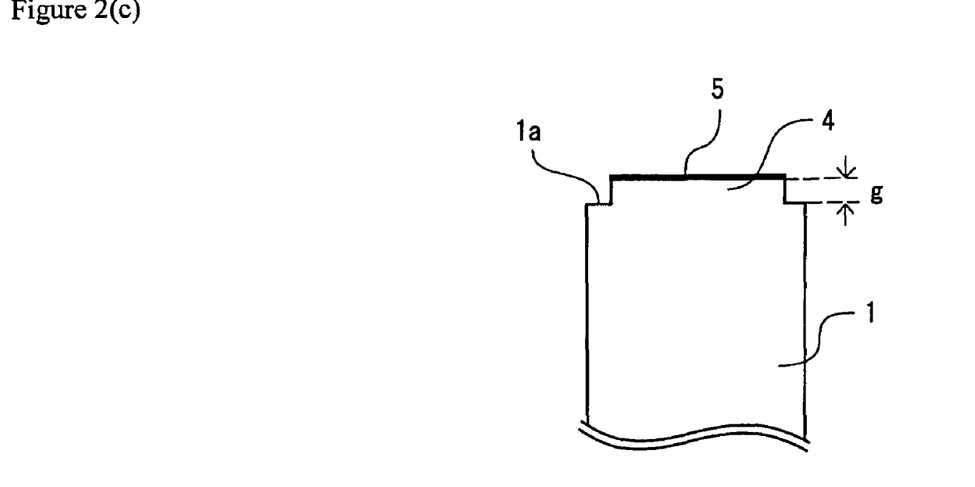
FIG. 2(c) is a cross-sectional view through B-B in FIG. 2(a)

FIGS. 2(a) to 2(c) are enlarged views of the reflecting end face of the light guide. FIG. 2(a) is a front view of the reflecting end face 1a, FIG. 2(b) is a cross-sectional view through A-A in FIG. 2(a), and FIG. 2(c) is a cross-sectional view through B-B in FIG. 2(a).

The reflective body 5 is provided on a projecting portion of the protruding portion 4 cut at the reflecting end face 1a. The reflective body 5 may be formed using a transparent bonding agent and a metal foil, such as aluminum foil, produced for plastic parts. Such foil allows hot stamping from a rear surface. The temperature during the heat transfer depends on the specific heat capacity of the material of the rod-like light guide 1. In the case of transparent acrylic resin, the temperature is desirably set in a range of 110° C. to 140° C. Note that the protruding portion 4 can be formed by injecting molding.

Note also that when the transparent acrylic resin is used as the material of the rod-like light guide 1 in the manner described above, thermal expansion in the rod-like light guide 1 cannot be avoided, even if the heat transfer temperature is set in the range from 110° C. to 140° C. When the heat transfer film is applied to the protruding portion 4 of the rod-like light guide 1, the heat melts a portion of the protruding portion 4, causing the protruding portion to expand beyond an original size, and the expanded portion to jut out in a width direction. If the rod-like light guide 1 had not been processed to form the protruding portion 4 and thus had a straight form, the expanded portion would be obstructive, making it difficult to insert of the rod-like light guide into the case. In the present invention, however, the above-described problem does not occur because an edge portion of the reflecting end face 1a is cut away so that an expansion portion resulting from the expansion of the protruding portion 4 stays within the periphery of the rod-like light guide 1, and the protruding portion is directly surrounded by inner surfaces of the case when the light guide is housed in the case.

For instance, when a width in a cross-sectional surface perpendicular to the longitudinal direction of the rod-like light guide 1 is 20 mm and the horizontal direction width is 10 mm, setting the processing dimensions of the protruding portion 4 for cutting so that a cut depth g is 0.3 mm and cut edge widths fa to fd are 0.15 mm reduces the area of the end face by approximately 2.2%. Experiments have shown that cut edge widths fa to fd which reduce the area of the protruding portion 4 to no less than approximately 80% of the area before cutting do not cause a significant difference in the light intensity. Thus, a surface area of the end surface of the protruding portion is preferably in a range of 80%≦x<100% of the surface area of an end surface of the first end face.

Figure 3A:
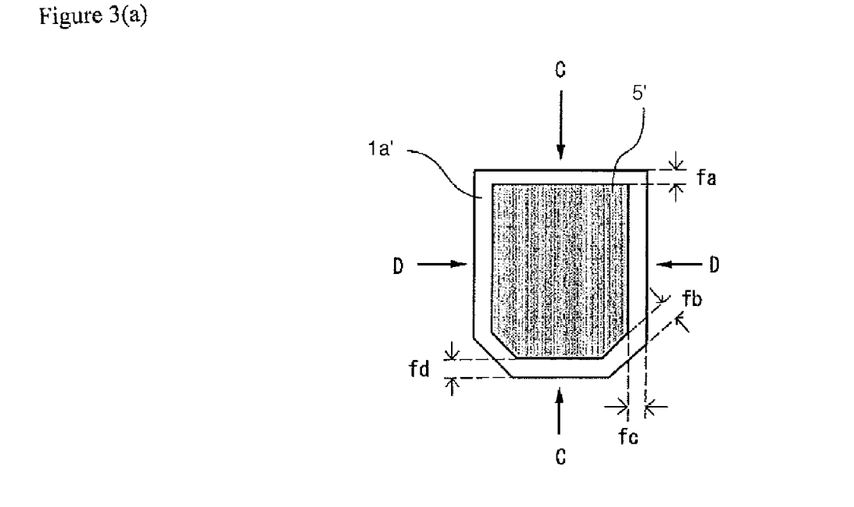
FIG. 3(a) is a diagram of an end face of a light guide of a further embodiment.
Figure 3B:
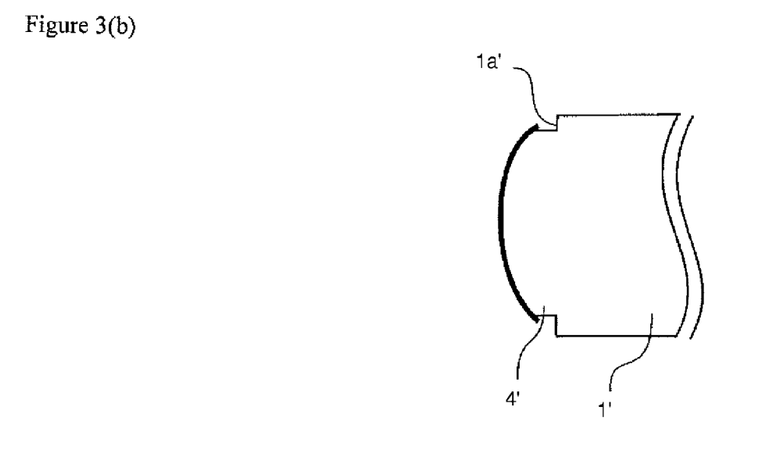
FIG. 3(b) is a cross-sectional view through C-C in FIG. 3(a)
Figure 3C:
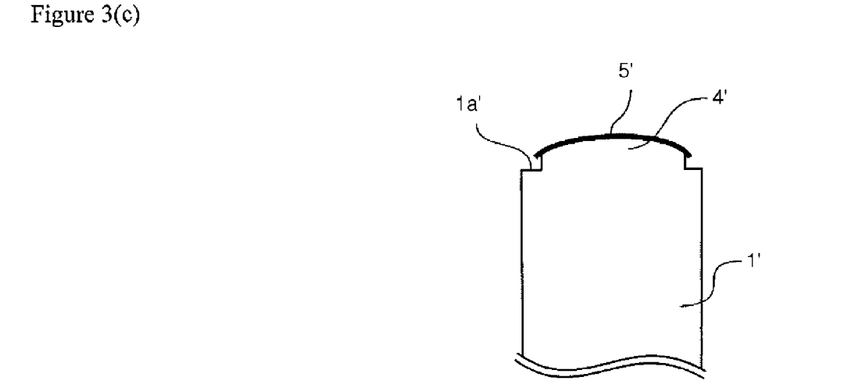
FIG. 3(c) is cross-sectional view through D-D in FIG. 3(a)

FIGS. 3(a) to 3(c) show an example in which the heat transfer film forming the reflective body 5' is bonded to a curved surface (a recess or protruding portion). FIG. 3(a) is a front elevation of the reflecting end face 1a', FIG. 3(b) is a cross-sectional view through C-C in FIG. 3(a), and FIG. 3(c) is a cross-sectional view through D-D in FIG. 3(a). In this case, the reflective body 5' in the in the rod-like light guide 1' has the same internal reflection effects as when the surface of the processed end face is flat.

Further, when the protruding portion 4' is cut, burring will occur at edge portions of the protruding portion. Hence, damage resulting from snagging of burrs when the rod-like light guide 1' is inserted into a case 7 (see FIG. 8) is avoided.

Figure 4A:
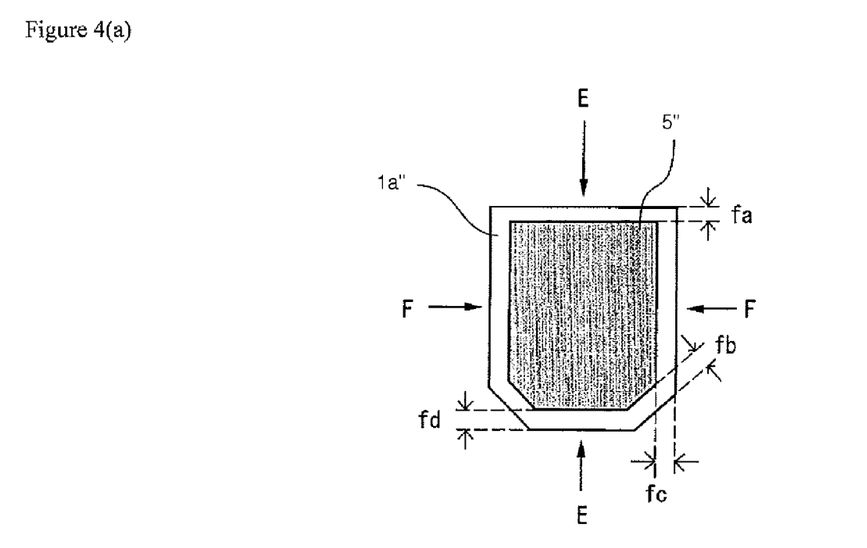
FIG. 4(a) is a diagram of an end face of a light guide of a further embodiment.
Figure 4B:
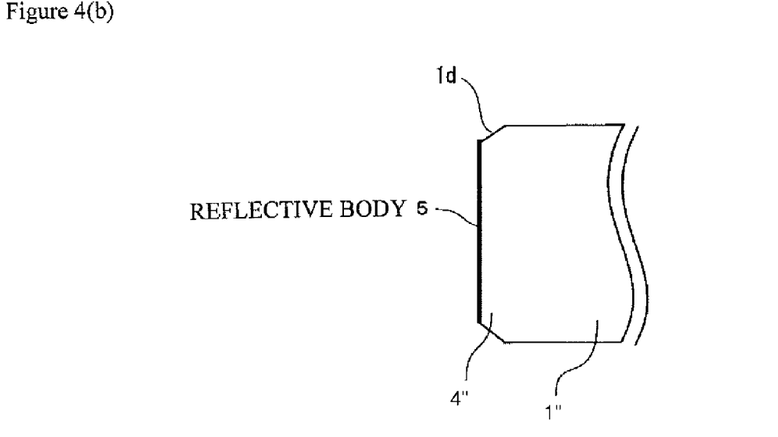
FIG. 4(b) is a cross-sectional view through E-E in FIG. 4(a)
Figure 4C:
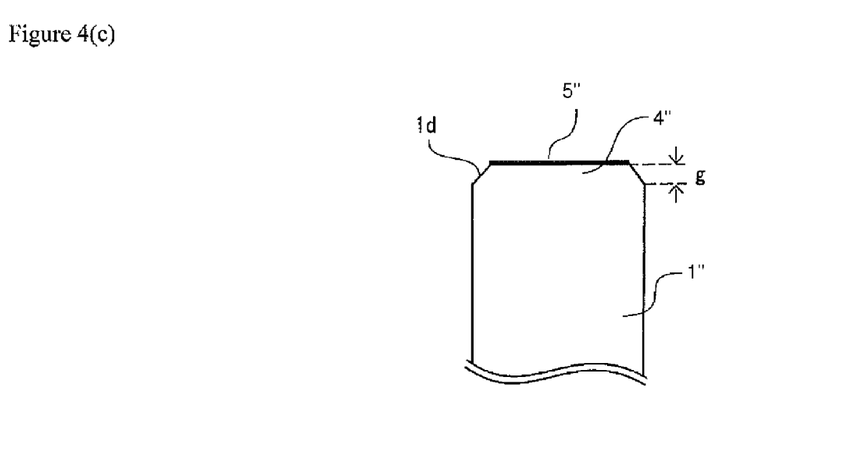
FIG. 4(c) is cross-sectional view through F-F in FIG. 4(a)

FIGS. 4(a) to 4(c) show an example in which tapered surfaces 1d'' are formed between the light guide 1'' and the protruding portion 4" to which the heat transfer film forming the reflective body 5" is bonded. FIG. 4(a) is a front view of the reflecting end face 1a", FIG. 4(b) is a cross-sectional view through E-E in FIG. 4(a), and FIG. 4(c) is a cross-sectional view through F-F in FIG. 4(a). This arrangement simplifies manufacture. Note that, here, the end face of the protruding portion 4" need not be flat.

Figure 5A:
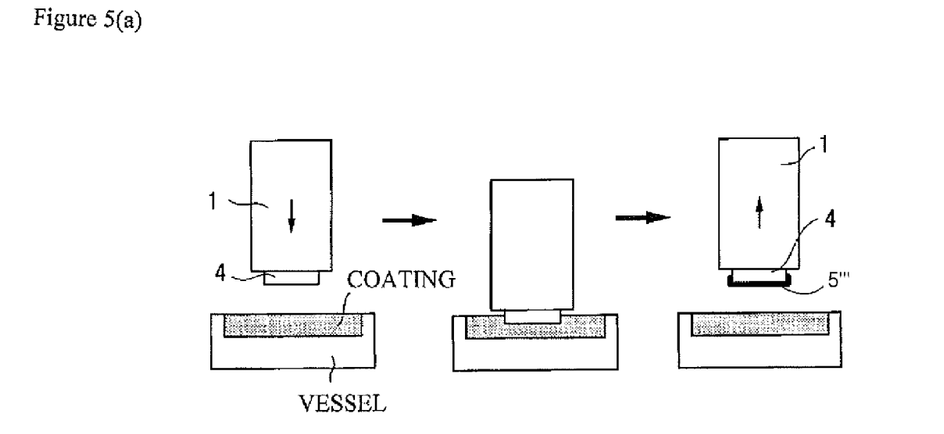
FIG. 5(a) is a diagram showing a further embodiment of means to provide the reflective body on the protruding portion.
Figure 5B:
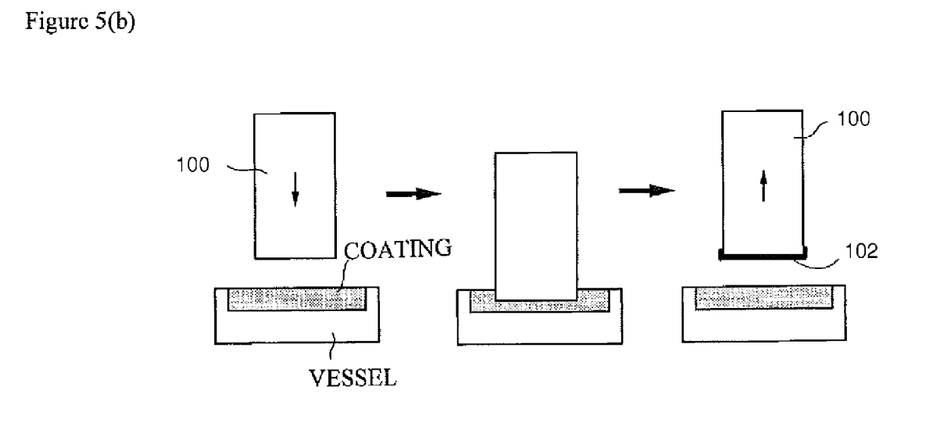
FIG. 5(b) is a diagram showing means to provide the reflective body when a protruding portion has not been provided.

FIG. 5(a) is a diagram showing a further embodiment of means to provide the reflective body on the protruding portion. FIG. 5(b) shows an example of the same means used when the protruding portion is not provided. In this embodiment, the protruding portion 4 formed at a distal end of the light guide 1 is immersed in a vessel containing a coating for forming the reflective body 5'''.

As described above, the coating wraps onto side surfaces of the protruding portion 4. However, the external dimensions of the end face of the protruding portion 4 viewed in the axial direction of the light guide 1 are set so that the covering of the side surfaces does not cause the reflective body 5''' to jut out from the end face of the light guide 1.

When the protruding portion 4 is not provided, the reflective body 102 bonds to the side surfaces of the light guide 100 as shown in FIG. 5(b). Thus, the reflective body 102 juts out beyond the external form of the light guide 100 as shown in FIG. 10. As a result, it may not be possible to house the light guide into the case. If the light guide is forcibly inserted, the reflective body may separate from the portion at which it is required.

Figure 6A:
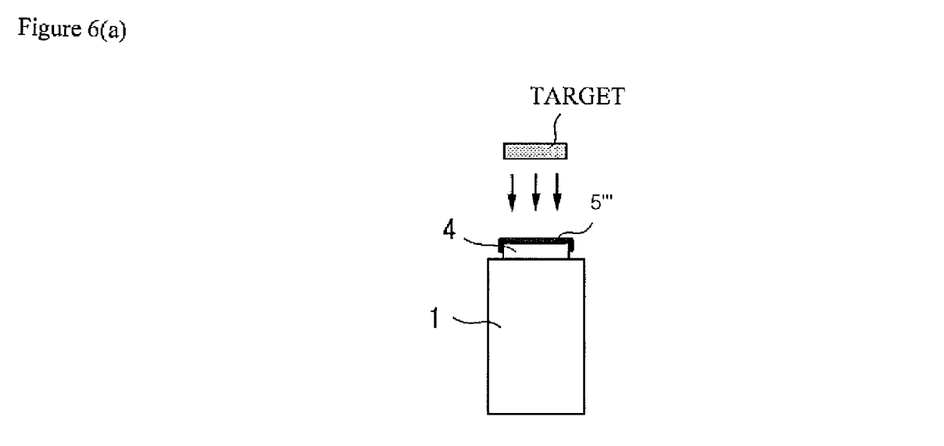
FIG. 6(a) is a diagram showing a further embodiment of means to provide the reflective body on the protruding portion.
Figure 6B:
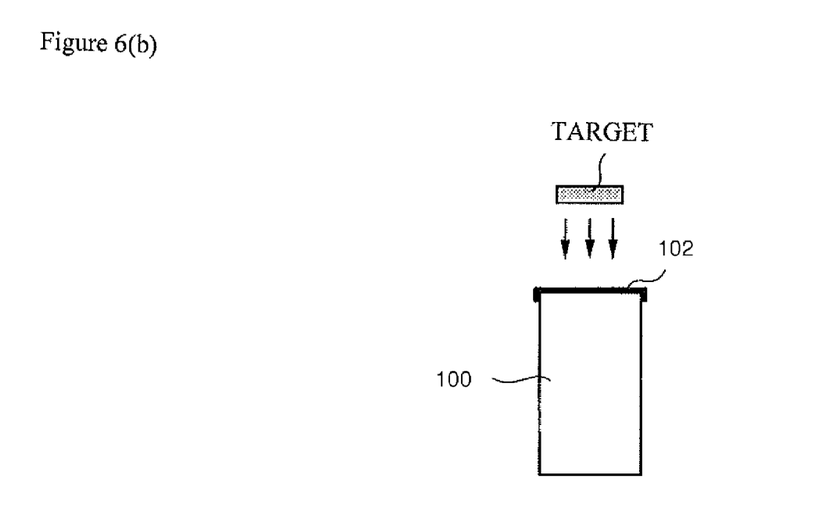
FIG. 6(b) is a diagram showing the means to provide the reflective body when a protruding portion has not been provided.

In the embodiment shown in FIG. 6(a), the reflective body 5''' is provided on the protruding portion 4 by deposition or sputtering using a target. In this case, the deposit of particles which forms the reflective body 5''' wraps onto the side surfaces of the protruding portion 4. However, the external dimensions of the end face of the protruding portion 4 when seen in the axial direction of the light guide 1 are determined so that the covering of the side surfaces does not cause the reflective body 5''' to jut out from the end face of the light guide 1. If the protruding portion 4 is not provided, the particles for forming the reflective body 102 undesirably bond to side faces of the light guide 100, as shown in FIG. 6(b).

Figure 7:
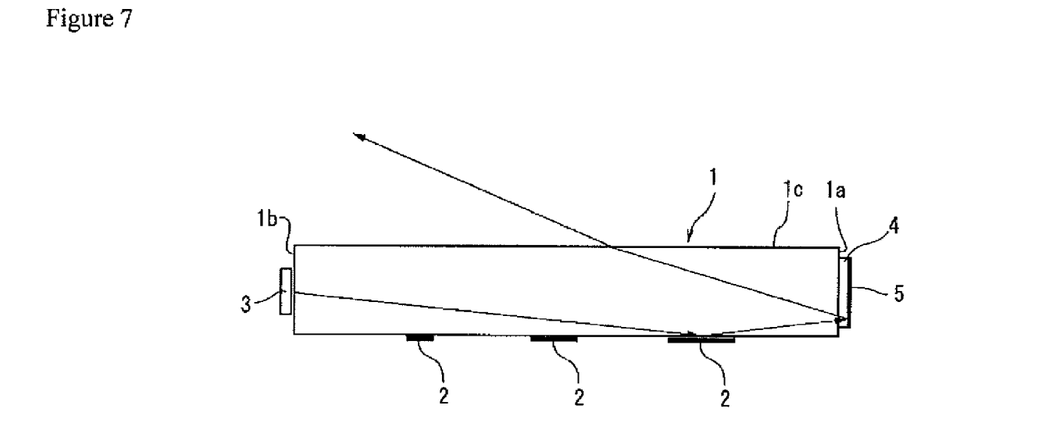
FIG. 7 is a diagram for describing a path of light in the rod-like light guide.

FIG. 7 is a diagram showing an example of internal reflection of incident light within the rod-like light guide 1 having the reflective body 5 bonded to the protruding portion 4. Light emitted from a light source 3 enters the rod-like light guide 1 from the incident end face 1b and the incident light propagates in a straight line so that a portion of the light arrives at the scattering pattern 2. Of the light reflected by the wall surfaces of the rod-like light guide 1 at positions of the scattering pattern 2, a portion arrives at the reflective body 5 that is bonded to the protruding portion 4. The arriving portion is reflected again, this time by the reflective body 5, and proceeds directly to the emitting face of the rod-like light guide 1. The light arriving at the emitting face is refracted, in accordance with Snell's law, at a refraction angle depending on the ratio between the refractive index of air and the refractive index of the rod-like light guide 1, and returns to the air.

With the area of the reflecting end face 1a taken to be 100%, experiments have shown that the area of the protruding portion 4 can be reduced to 80% without significantly affecting the overall light intensity of the light emitted from the emitting face 1c.

Second Embodiment

Figure 8:
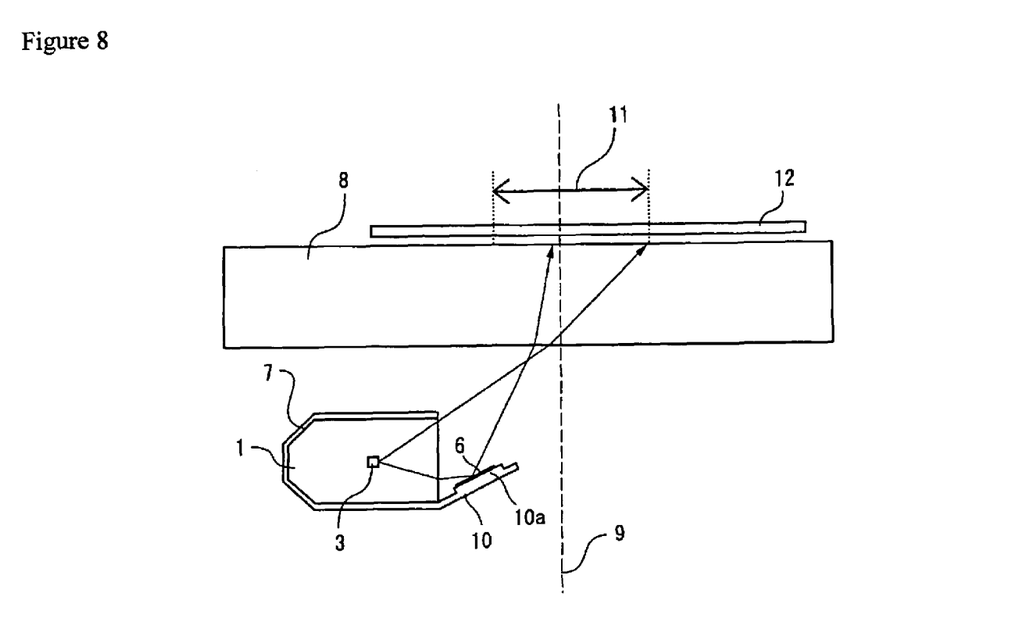
FIG. 8 is a diagram showing a further embodiment of a line lighting device.

FIG. 8 is a diagram showing a second embodiment of the present invention in which an extended portion 10 is provided in an integrated manner in a case. FIG. 8 shows an example light path for light reflected by a reflective surface 6 provided on an emitting face-opposing surface of the extended portion 10. A reflective plate is provided with a protruding portion 10a on the extended portion 10, and can be formed using a simplified manufacturing process by forming the reflective surface 6 on the protruding portion 10a using a heat transfer film.

A portion of light emitted from the light source 3 arrives at a top plate glass 8 via the rod-like light guide 1 and illuminates paper 12. A further portion of light does not arrive directly at the top plate glass 8, but arrives after passing through the rod-like light guide 1 and being reflected by the reflective surface 6. Hence, with the rod-like light guide 1 in a fixed state, it is possible to light a range of the paper 12 corresponding to a lighting region 11 centered at a reading light axis 9.

Providing the reflective surface 6 in the case 7 makes it possible to vary the direction of the illuminating light. Conventionally, it was necessary to position the case 7 so as to be inclined with respect to a lighting region 11. In the case of the lighting device of the present invention, however, no inclination of the case 7 of the lighting device is necessary. Fixing the case 7 horizontally allows the space occupied by the lighting device to be reduced. Hence, when the case 7 holding the rod-like light guide 1 is used in an image reading device, the overall size of the device can be reduced.

The reflective surface 6 may be a flat surface, or a curved surface of a suitable curvature. Alternatively, the reflective surface 6 may be a flat surface constructed by connecting a plurality of pyramids, cones or semi-spherical portions. Another possibility is to use a sheet having a plurality of pyramids, cones or semi-spherical portions mounted on heat transfer film surface thereof.

Note that although the above-described embodiment of the present invention records a rod-like light guide, the light guide is not limited to being rod-like. The invention may also be applied to other forms of light guide such a planar light guide.

Figure 9:
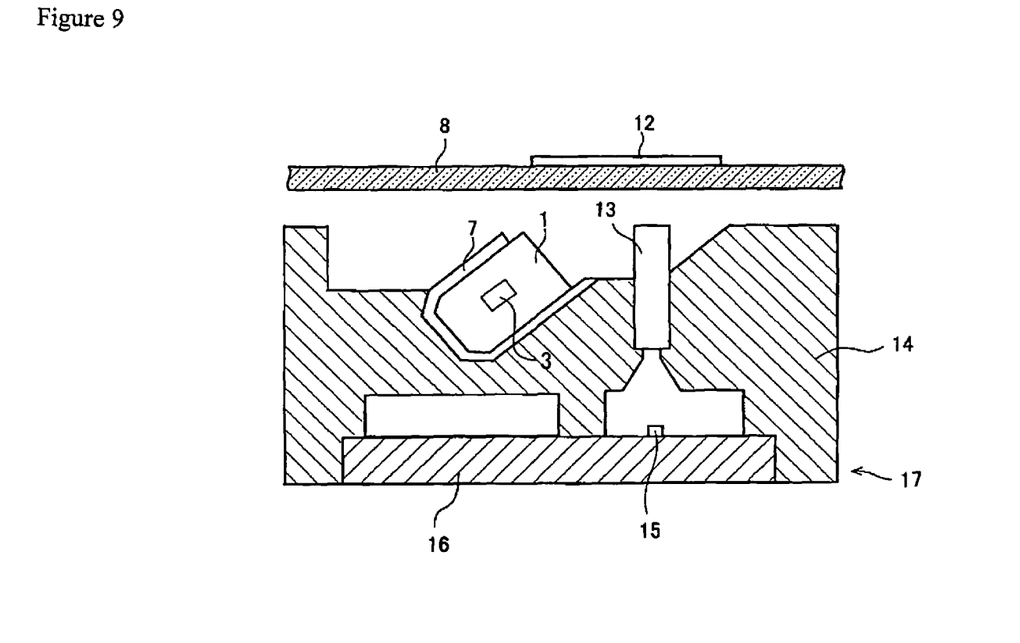
FIG. 9 is a cross-sectional view of an image reading device according to an exemplary embodiment of the present invention.

FIG. 9 is a cross-sectional view of the image reading device according to the present invention. As shown in FIG. 9, the image reading device includes a glass plate 8 on which to place paper. A contact-type image sensor 17 moves parallel to the glass plate 8 and reads the paper 12. The direction of the movement is a sub-scanning direction and a direction perpendicular to the direction of the movement (i.e. a longitudinal direction of the image reading device) is a main scanning direction.

In the contact-type image sensor 17, a casing (casing body) 14 is formed to include a plurality of recesses. One of the recesses has disposed therein a line lighting device which makes uses of the rod-like light guide 1 held in a case 7. The other recess has fixed therein a sensor substrate 16 including a photoelectric conversion device (line image sensor) 15. The casing 14 further holds a lens array 13 for magnifying and focusing light.

In this construction, light emitted from the light emitting unit 3 is internally reflected within the rod-like light guide 1, and the light emitted from the emitting face of the rod-like light guide 1 illuminates the paper. Light reflected from the paper is detected by the photoelectric conversion device (line image sensor) 15 via the lens array 13 and the like, and a single line of the image on the paper is read. Thus, moving the contact-type image sensor in the sub-scanning direction makes it possible to read the whole of the image on the paper.

As described above, it is possible to achieve similar advantages when a planar lighting device is used rather than the rod-like light guide 1. Use of a planar lighting device can therefore be considered.

Although there have been described what are the present embodiments of the invention, it will be understood that variations and modifications may be made thereto within the scope of the claims appended hereto.

The invention claimed is:

1. One of a rod-shaped and plate-shaped light guide in combination with a case which houses the light guide, wherein the light guide comprises:
   a first end including an incident surface that receives illuminating light incident thereon;
   a second end longitudinally opposite the first end;
   a bottom surface having a reflecting portion which reflects illuminating light incident on the incident surface;
   an emitting face which emits the light reflected by the light reflecting portion;
   a protruding portion protruding longitudinally and continuously from the light guide at the second end thereof, the protruding portion having a reduced peripheral dimension on all sides thereof in comparison to a peripheral dimension of an adjacent portion of the light guide when viewed along an axial direction of the light guide; and
   a reflective body provided on the protruding portion and covering a longitudinal end face of the protruding portion which extends perpendicular to the emitting face of the light guide,
   wherein the reduced peripheral dimension of the protruding portion is set so that, when viewed along the axial direction of the light guide, the reflective body does not jut out from an end face of the light guide even when the reflective body wraps on to a side surface of the protruding portion or expansion occurs, and
   wherein when the light guide is housed in the case the protruding portion is directly surrounded by inner surfaces of the case.

2. The light guide and case of claim 1, wherein a surface area of the end surface of the protruding portion is in a range of 80% <x<100% of the surface area of an end surface of the first end face.

3. The light guide and case of claim 1, wherein the reflective body wraps on to a side surface of the protruding portion, and a peripheral dimension of the protruding portion having the reflective body wrapped on to the side surface thereof is less than or equal to the peripheral dimension of the adjacent portion of the light guide when viewed along an axial direction of the light guide.

4. The light guide and case of claim 1, wherein the protruding portion has a same cross-sectional the adjacent portion of light guide but with the reduced peripheral dimension.

5. The light guide and case of claim 1, wherein the longitudinal end face of the protruding portion extends perpendicular to a side surface of the light guide extending between the bottom surface and the emitting face of the light guide.

6. A plane lighting device comprising:
   the plate-shaped light guide and case according to claim 1; and
   a light source fixed at an end portion of the plate-shaped light guide.

7. A contact-type image sensor comprising:
   the plane lighting device of claim 6;
   an image sensor including a photoelectric conversion device; and
   a lens array for focusing, towards the image sensor, reflected light from paper disposed in a lighting region of the contact-type image sensor, the reflected light being a portion of illumination light from the lighting device.

8. An image reading device comprising the contact-type image sensor of claim 7.

9. The light guide and case according to claim 1, wherein a peripheral surface of the light guide is made up of a top face that is the emitting face, two side faces, the bottom face and a plane portion formed by performing a C-chamfer working between the bottom face and each of the two side faces, so that the end face forms a six-sided shape.

10. A line lighting device comprising:
   the rod-shaped light guide and case according to claim 9;
   a case for housing the light guide so as to expose the emitting face; and
   a light source fixed at one end of the case.

11. The line lighting device of claim 10, wherein a surface area of the end surface of the protruding portion is in a range of 80% <x<100% of the surface area of an end surface of the first end face.

12. A contact-type image sensor comprising:
   the line lighting device of claim 10;
   a line image sensor including a photoelectric conversion device; and
   a lens array for focusing, towards the line image sensor, reflected light from paper disposed in a lighting region of the contact-type image sensor, the reflected light being a portion of illumination light from the lighting device.

13. An image reading device comprising the contact-type image sensor of claim 12.

14. The line lighting device of claim 10, wherein
   an extended portion is provided on the case along a longitudinal direction of the case, a protruding portion is formed on a surface of the extended portion that opposes the emitting face of the light guide, and a reflective body is formed on the protruding portion.

15. The line lighting device of claim 14, wherein the extended portion of the case extends away from the light emitting face of the light guide at an angle in spaced relation thereto.

16. A contact-type image sensor comprising:
   the line lighting device of claim 14;
   a line image sensor including a photoelectric conversion device; and
   a lens array for focusing, towards the line image sensor, reflected light from paper disposed in a lighting region of the contact-type image sensor, the reflected light being a portion of illumination light from the lighting device.

17. An image reading device comprising the contact-type image sensor of claim 16.

* * * * *